US011381602B2

(12) United States Patent
Kawauchi et al.

(10) Patent No.: US 11,381,602 B2
(45) Date of Patent: Jul. 5, 2022

(54) SECURITY DESIGN PLANNING SUPPORT DEVICE

(71) Applicant: HITACHI, LTD., Tokyo (JP)

(72) Inventors: Takashi Kawauchi, Tokyo (JP); Eriko Ando, Tokyo (JP); Chinatsu Yamauchi, Tokyo (JP); Yasushi Nagai, Saitama (JP)

(73) Assignee: HITACHI, LTD., Tokyo (JP)

( * ) Notice: Subject to any disclaimer, the term of this patent is extended or adjusted under 35 U.S.C. 154(b) by 138 days.

(21) Appl. No.: 16/798,036

(22) Filed: Feb. 21, 2020

(65) Prior Publication Data

US 2020/0274901 A1   Aug. 27, 2020

(30) Foreign Application Priority Data

Feb. 22, 2019   (JP) .............................. JP2019-030972

(51) Int. Cl.
*H04L 29/00*   (2006.01)
*H04L 9/40*   (2022.01)
(Continued)

(52) U.S. Cl.
CPC ............ *H04L 63/20* (2013.01); *B60R 16/023* (2013.01); *H04L 63/0263* (2013.01); *H04L 63/1433* (2013.01); *H04L 67/12* (2013.01)

(58) Field of Classification Search
CPC ..... H04L 63/20; H04L 63/0263; H04L 67/12; H04L 63/1433; H04L 63/143; H04L 67/123; B60R 16/023
See application file for complete search history.

(56) References Cited

U.S. PATENT DOCUMENTS 7,095,854 B1 *   8/2006   Ginter ..................... G06F 21/10
                                                    380/231
8,560,609 B2 *   10/2013   Nathanson .............. H04L 69/04
                                                    709/204
(Continued)

FOREIGN PATENT DOCUMENTS

EP   3 151 114 A1   4/2017
JP   5145907 B2   2/2013

OTHER PUBLICATIONS

European Extended Search Report dated May 12, 2020 regarding European Patent Application No. 20158789.6 corresponding to U.S. Appl. No. 16/798,036 (8 pages).
(Continued)

*Primary Examiner* — Don G Zhao
(74) *Attorney, Agent, or Firm* — Mattingly & Malur, PC (57) ABSTRACT

A security design planning support device which supports planning of a security design of an in-vehicle network, includes: a strategy policy creation unit which creates first strategy policy information representing a plurality of control strategies corresponding respectively to threats against the in-vehicle network; a merge processing unit which merges control strategies of a same type among the plurality of control strategies represented by the first strategy policy information created by the strategy policy creation unit and groups the plurality of control strategies; and a communication unit which externally outputs second strategy policy information representing a relationship of the threats and the plurality of control strategies grouped by the merge processing unit.

11 Claims, 10 Drawing Sheets

(51) Int. Cl.
  *B60R 16/023* (2006.01)
  *H04L 67/12* (2022.01)

(56) References Cited

U.S. PATENT DOCUMENTS

| | | | | |
|---|---|---|---|---|
| 10,185,327 | B1* | 1/2019 | Konrardy | B60L 53/36 |
| 2003/0212909 | A1* | 11/2003 | Chandrashekhar | G06F 21/577 |
| | | | | 726/25 |
| 2006/0161879 | A1* | 7/2006 | Lubrecht | G06Q 10/06 |
| | | | | 717/101 |
| 2007/0157311 | A1* | 7/2007 | Meier | G06F 21/577 |
| | | | | 726/22 |
| 2007/0276674 | A1* | 11/2007 | Hemmat | G06Q 10/06375 |
| | | | | 705/300 |
| 2007/0288208 | A1* | 12/2007 | Grigsby | G06Q 10/06 |
| | | | | 703/2 |
| 2013/0304513 | A1* | 11/2013 | Hyde | G06Q 40/08 |
| | | | | 705/4 |
| 2013/0304514 | A1* | 11/2013 | Hyde | G06Q 40/08 |
| | | | | 705/4 |
| 2015/0033305 | A1* | 1/2015 | Shear | G06F 21/6218 |
| | | | | 726/6 |
| 2015/0302213 | A1* | 10/2015 | Hashimoto | G06F 21/577 |
| | | | | 726/1 |
| 2016/0255154 | A1* | 9/2016 | Kim | H04L 67/12 |
| | | | | 726/25 |
| 2017/0180480 | A1* | 6/2017 | Yang | H04L 12/1895 |
| 2017/0223046 | A1* | 8/2017 | Singh | H04L 63/1491 |
| 2017/0270924 | A1* | 9/2017 | Fleurence | G10L 15/22 |
| 2017/0310705 | A1* | 10/2017 | Gopalakrishna | H04L 41/0886 |
| 2017/0316215 | A1* | 11/2017 | Hadzic | G06F 21/604 |
| 2018/0005254 | A1* | 1/2018 | Bai | H04L 67/34 |
| 2018/0077189 | A1* | 3/2018 | Doppke | H04L 63/20 |
| 2019/0036948 | A1* | 1/2019 | Appel | H04L 63/20 |
| 2019/0220023 | A1* | 7/2019 | Noess | B62D 11/04 |
| 2020/0005645 | A1* | 1/2020 | Wray | B60W 30/18154 |
| 2020/0027096 | A1* | 1/2020 | Cooner | H04L 67/12 |
| 2020/0137102 | A1* | 4/2020 | Sheridan | H04L 41/28 |

OTHER PUBLICATIONS

TCG TPM 2.0 Automotive Thin Profile Family "2.0" (Dec. 12, 2018) "Protection Profile Automotive-Thin Specific TPM," Level 0 Version 1.0, pp. 104.

* cited by examiner

THREAT ANALYSIS TABLE

2000

| THREAT NUMBER | ASSET | THREAT CHARACTERISTICS ||||| RISK VALUE |
| --- | --- | --- | --- | --- | --- | --- | --- |
| | | FROM WHERE | WHO | WHEN | WHY | HOW | |
| 301 | 302 | 303 | 304 | 305 | 306 | 307 | 308 |
| 1 | CONTROL FUNCTION | CAN INTERFACE | USER | DURING OPERATION | NEGLIGENCE | HINDERS OPERATION THROUGH MASS ACCESS TO FUNCTION | 9.0 |
| 2 | COMMUNICATION FUNCTION | WIRELESS COMMUNICATION INTERFACE | THIRD PARTY | DURING MAINTENANCE | INTENTIONAL | STOPS OPERATION THROUGH USE OF OFFICIALLY EXISTING SETTING FUNCTION | 5.0 |
| 3 | MAP INFORMATION | UNOFFICIAL INTERFACE | DEALER STAFF | DURING DISPOSAL | NEGLIGENCE | READS INFORMATION | 3.0 |
| ... | ... | ... | ... | ... | ... | ... | ... |

FIG.4

CONTROL STRATEGY TABLE

2100

| CONTROL STRATEGY NUMBER (401) | CONTROL STRATEGY (402) |
|---|---|
| 1 | COUNTER-MEASURES AGAINST DoS |
| 2 | COUNTERMEASURES AGAINST UNAUTHORIZED ACCESS |
| 3 | COUNTERMEASURES AGAINST FALSIFICATION/ OVERWRITING |
| ... | ... |

FIG. 5

CONTROL STRATEGY SELECTION TABLE

2200

| 501 | 502 | 503 | 504 LINK WORD | | | | 508 | 509 |
|---|---|---|---|---|---|---|---|---|
| NUMBER | NOT | NOT | AND | OR | OR | OR | CONTROL STRATEGY NUMBER | CONTROL STRATEGY |
| | | | | 505 | 506 | 507 | | |
| 1 | — | — | — | — | HINDERS OPERATION THROUGH MASS ACCESS TO FUNCTION | NEGLIGENCE | 1 | COUNTER-MEASURES AGAINST DoS |
| 2 | — | — | — | WIRELESS COMMUNI-CATION INTERFACE | STOPS OPERATION THROUGH USE OF OFFICIALLY EXISTING SETTING FUNCTION | INTENTIONAL | 2 | COUNTER-MEASURES AGAINST UNAUTHO-RIZED ACCESS |
| 3 | OFFICIAL INTERFACE | — | — | — | INTENTIONAL | UNOFFICIAL INTERFACE | 3 | COUNTER-MEASURES AGAINST FALSIFICATION/OVERWRITING |
| ... | ... | ... | ... | ... | ... | ... | ... | ... |

FIG. 6

MERGE RULE TABLE

2300

| NUMBER | ASSET TYPE | FROM WHERE | MERGE CONDITION ||||| RISK VALUE |
| | | | WHO | WHEN | WHY | HOW | |
| --- | --- | --- | --- | --- | --- | --- | --- |
| 1 | FUNCTION | - | - | - | - | HINDERS OPERATION THROUGH MASS ACCESS TO FUNCTION | 9.0 – 6.0 |
| 2 | - | - | - | - | INTEN-TIONAL | STOPS OPERATION THROUGH USE OF OFFICIALLY EXISTING SETTING FUNCTION | - |
| 3 | INFORMATION | UNOFFICIAL INTERFACE | - | - | - | READS INFORMATION | - |
| ... | ... | ... | ... | ... | ... | ... | ... |

601 — NUMBER
602 — ASSET TYPE
603 — FROM WHERE
604 — WHO
605 — WHEN
606 — WHY
607 — HOW
608 — RISK VALUE

FIG. 7

STRATEGY POLICY TABLE (PRE-MERGE)

2400

| 701 | 702 | 703 | 704 | 705 | 706 | 707 | 708 | 709 |
|---|---|---|---|---|---|---|---|---|
| | | | | THREAT CHARACTERISTICS | | | | |
| THREAT NUMBER | ASSET | FROM WHERE | WHO | WHEN | WHY | HOW | RISK VALUE | CONTROL STRATEGY NUMBER |
| 1 | CONTROL FUNCTION | CAN INTERFACE | USER | DURING OPERATION | NEGLIGENCE | HINDERS OPERATION THROUGH MASS ACCESS TO FUNCTION | 9.0 | 1 |
| 2 | COMMUNICATION FUNCTION | WIRELESS COMMUNICATION INTERFACE | THIRD PARTY | DURING MAINTENANCE | INTENTIONAL | STOPS OPERATION THROUGH USE OF OFFICIALLY EXISTING SETTING FUNCTION | 5.0 | 2 |
| 3 | MAP INFORMATION | UNOFFICIAL INTERFACE | DEALER STAFF | DURING DISPOSAL | NEGLIGENCE | READS INFORMATION | 3.0 | 3 |
| ... | ... | ... | ... | ... | ... | ... | ... | ... |

FIG. 8

STRATEGY POLICY TABLE (POST-MERGE)

2500

| THREAT NUMBER | ASSET | THREAT CHARACTERISTICS | | | | | RISK VALUE | CONTROL STRATEGY NUMBER |
|---|---|---|---|---|---|---|---|---|
| | | FROM WHERE | WHO | WHEN | WHY | HOW | | |
| 801 | 802 | 803 | 804 | 805 | 806 | 807 | 808 | 809 |
| 1, 5, 9, 13, 19 | CONTROL FUNCTION | CAN INTERFACE | USER, THIRD PARTY | DURING OPERATION, DURING MAINTENANCE | NEGLIGENCE, INTENTIONAL | HINDERS OPERATION THROUGH MASS ACCESS TO FUNCTION | 9.0~7.6 | 1, 4, 5 |
| 2, 20, 2 | COMMUNICATION FUNCTION | WIRELESS COMMUNICATION INTERFACE, USB INTERFACE | THIRD PARTY | DURING MAINTENANCE | INTENTIONAL | STOPS OPERATION THROUGH USE OF OFFICIALLY EXISTING SETTING FUNCTION | 5.0~4.0 | 2, 7, 8 |
| 3, 33, 37 | MAP INFORMATION, UPDATE SOFTWARE | UNOFFICIAL INTERFACE | DEALER STAFF | DURING DISPOSAL | NEGLIGENCE | READS INFORMATION | 3.7~2.2 | 3, 9, 10 |
| ... | ... | ... | ... | ... | ... | ... | ... | ... |

SECURITY DESIGN PLANNING SUPPORT DEVICE

TECHNICAL FIELD

The present invention relates to a device which supports the planning of a security design to be performed by a designer of an in-vehicle network system.

BACKGROUND ART

With vehicles in recent years, an in-vehicle network configured using an in-vehicle LAN (Local Area Network) and the like is becoming popular as an environment for easily collecting and managing control data of various types of ECU (Electrical Control Unit) installed in vehicles. As a technology which uses this kind of in-vehicle network, for example, the development of a technology of adding a communication function to a vehicle for communicating with other vehicles and external servers, and, by using this communication function, collecting ambient environment information to be used in automated driving and drive assist and updating the software of ECUs is being advanced.

With a conventional in-vehicle network system, an original OS and network are generally used, and the configuration did not allow connection to an external system. Thus, it was considered that the in-vehicle network system would not be exposed to a security threat by being attacked with a virus or the like from the outside. Nevertheless, in recent years, open architecture is also being promoted in the field of in-vehicle network systems, and the adoption of general-purpose OS and standard protocols is getting underway. In light of the foregoing circumstances, reports of cyberattacks against in-vehicle network systems, which were conventionally considered to be safe, are increasing year by year.

In relation to measures against security threats via cyber-attacks, for instance, in the field of general information systems, ISO/IEC15408, which is an international standard related to the development, manufacture and operation of security products (hardware/software) and information systems, is being utilized for improving the warranty level of security implementation. With ISO/IEC15408, it is necessary to analyze the security threats that may occur against the target information system and formulate security measures therefor, and create a Security Target (ST).

Meanwhile, in order for a designer or an administrator to properly formulate security measures of an information system, it is necessary to be familiar with the configuration and topology structure of that information system, and extremely sophisticated techniques and numerous man-hours are required. In connection with this, for instance, the technology of PTL 1 is known. PTL 1 describes a technology of omitting the necessity of building threat countermeasure knowledge which matches the configuration of individual information systems, and thereby alleviating the administrator's burden by using knowledge which can be applied commonly to a plurality of information system having a different system configuration.

CITATION LIST

Patent Literature

PTL 1 Japanese Patent No. 5145907

SUMMARY OF INVENTION

Technical Problem

With the technology described in PTL 1, the correspondence of individual threats and measures is unclear and, therefore, there is a problem in that the administrator is unable to easily confirm the security measures required for the threats that are anticipated in the target information system.

Solution to Problem

The security design planning support device according to the present invention is a security design planning support device which supports planning of a security design of an in-vehicle network, comprising a strategy policy creation unit which creates first strategy policy information representing a plurality of control strategies corresponding respectively to threats against the in-vehicle network, a merge processing unit which merges control strategies of a same type among the plurality of control strategies represented by the first strategy policy information created by the strategy policy creation unit and groups the plurality of control strategies, and a communication unit which externally outputs second strategy policy information representing a relationship of the threats and the plurality of control strategies grouped by the merge processing unit.

Advantageous Effects of Invention

According to the present invention, it is possible to easily confirm the security measures required against the threats that are anticipated in an in-vehicle network.

DESCRIPTION OF EMBODIMENTS

Figure 1:
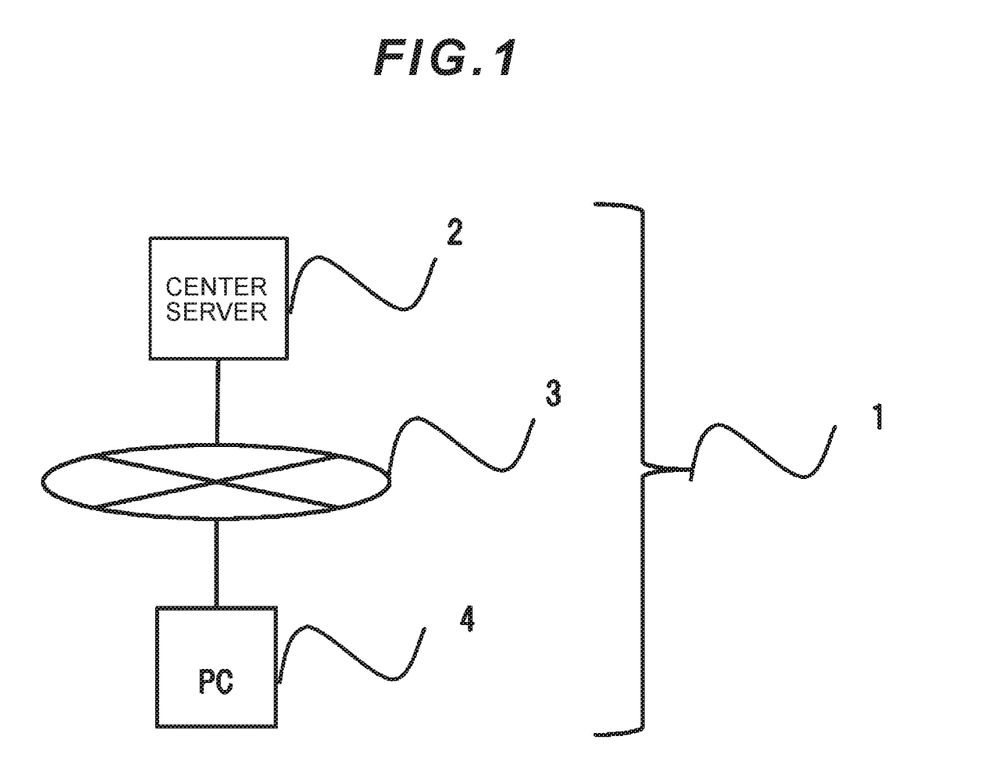
FIG. 1 is a configuration diagram of the security design planning support system according to an embodiment of the present invention.

An embodiment of the present invention is now explained with reference to the appended drawings. FIG. 1 is a configuration diagram of the security design planning support system according to an embodiment of the present invention. The security design planning support system 1 shown in FIG. 1 is an information communication system, and includes a center server 2, a network 3, and a PC (personal computer) 4.

The PC 4 comprises a display device (not shown). The center server 2 and the PC 4 are mutually connected via the network 3. The center server 2 performs data communication with the PC 4 via the network 3. As the network 3, for example, a WAN (Wide Area Network) may be used. Note that, while only one PC 4 is illustrated in FIG. 1, with the security design planning support system 1, a plurality of PCs 4 may be installed at respectively different sites.

The security design planning support system 1 supports the planning of the security design to be performed by the designer of an in-vehicle network, which is used by being mounted on a vehicle such as an automobile, by the center server 2 and the PC 4 performing data communication via the network 3. Here, the center server 2 receives, from the PC 4, information related to the security threat input by the designer to the PC 4, and analyzes the strategy policy against the threat by using the received information and pre-stored information. The center server 2 subsequently sends the analytical result to the PC 4 and causes the display device of the PC 4 to display the analytical result.

The in-vehicle network, in which the security design planning thereof is to be supported by the security design planning support system 1, is configured from a plurality of devices comprising a data communication function. The plurality of devices include, for example, various types of ECU mounted on the vehicle, and a communication device for use in communication with an external network.

As described above, with the security design planning support system 1 of this embodiment, processing for supporting the planning of the strategy policy against the security threat that is anticipated in the in-vehicle network to be designed is performed by the center server 2. The PC 4 functions as an HMI (human machine interface) by receiving the results of the processing performed by the center server 2 from the center server 2 and displaying such processing results on the display device, and receiving input information from the designer and sending the input information to the center server 2. Thus, in the ensuing explanation, the operation of the center server 2 will be mainly explained.

Figure 2:
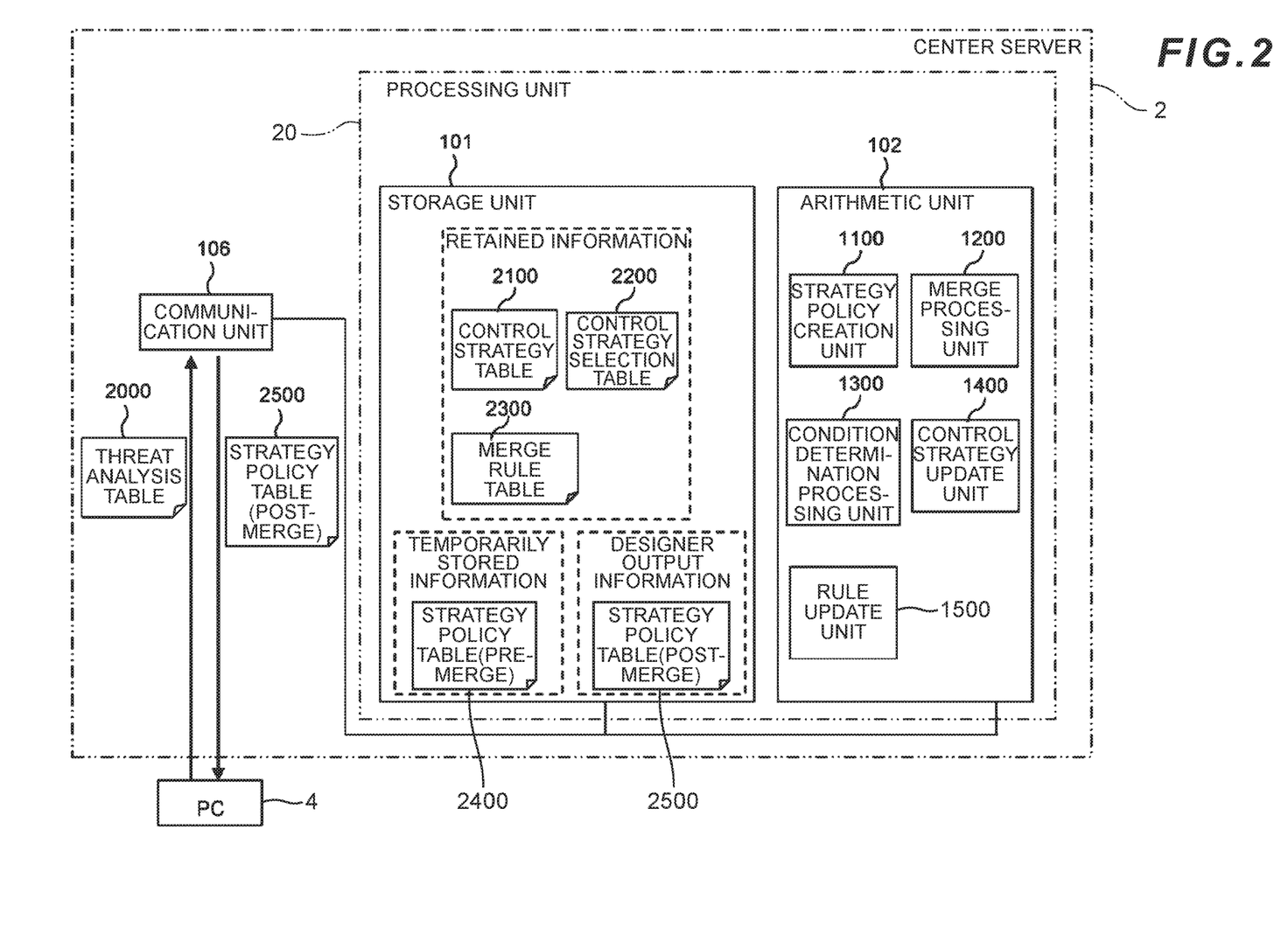
FIG. 2 is a block diagram illustrating the functional configuration of the center server.

FIG. 2 is a block diagram illustrating the functional configuration of the center server 2. The center server 2 comprises a communication unit 106, and a processing unit 20 connected to the communication unit 106.

The processing unit 20 comprises a storage unit 101 and an arithmetic unit 102. The arithmetic unit 102 executes various types of arithmetic processing for supporting the planning of the strategy policy against the security threat in the in-vehicle network to be designed by using the information retained in the storage unit 101 and the information acquired by the communication unit 106 from the PC 4. Consequently, the center server 2 functions as the security design planning support device which supports the planning of the security design of the in-vehicle network.

The storage unit 101 is configured by using a nonvolatile storage device such as a flash memory or an HDD, and stores and retains various types of information such as a control strategy table 2100, a control strategy selection table 2200, a merge rule table 2300, a strategy policy table (pre-merge) 2400, and a strategy policy table (post-merge) 2500. Among the above, the control strategy table 2100, the control strategy selection table 2200, and the merge rule table 2300 are information (retained information) that is pre-set and retained in the storage unit 101 in advance. Meanwhile, the strategy policy table (pre-merge) 2400 is information (temporarily stored information) that is created based on the processing of the arithmetic unit 102 and temporarily stored in the storage unit 101. Moreover, the strategy policy table (post-merge) 2500 is information (designer output information) that is created based on the strategy policy table (pre-merge) 2400 and output to the PC 4. The term "control strategy" may be referred to as the term "proposed measures", the term "strategy policy" may be referred to as the term "measures policy", and the term "strategy" may be referred to as the term "measures" in this embodiment.

The control strategy table 2100 is information in which currently available control strategies are listed in a table format in the in-vehicle network to be designed. The control strategy table 2100 is used when the strategy policy creation unit 1100 described later is to create the strategy policy table (pre-merge) 2400, and updated by the control strategy update unit 1400 described later.

The control strategy selection table 2200 is information in which the selective conditions for selecting the appropriate control strategy against the threat that is anticipated in the in-vehicle network to be designed are listed in a table format. The control strategy selection table 2200 is used when the strategy policy creation unit 1100 described later is to create the strategy policy table (pre-merge) 2400, and updated by the rule update unit 1500 described later.

The merge rule table 2300 is information in which the merge conditions for merging and grouping the control strategies of the same type, among the plurality of control strategies included in the strategy policy table (pre-merge) 2400, are listed in a table format. The merge rule table 2300 is used when the merge processing unit 1200 described later is to create the strategy policy table (post-merge) 2500 from the strategy policy table (pre-merge) 2400, and updated by the rule update unit 1500 described later.

The strategy policy table (pre-merge) 2400 is information in which the plurality of control strategies corresponding respectively to the various threats anticipated in the in-vehicle network to be designed are listed in a table format. The strategy policy table (pre-merge) 2400 is created by the strategy policy creation unit 1100 described later, and stored as temporarily stored information in the storage unit 101.

The strategy policy table (post-merge) 2500 is information obtained by merging and grouping the control strategies of the same type, among the plurality of control strategies included in the strategy policy table (pre-merge) 2400, and is listed in a table format in the same manner as the strategy policy table (pre-merge) 2400. The strategy policy table (post-merge) 2500 is created by the merge processing unit 1200 described later, and is stored as designer output information in the storage unit 101.

The arithmetic unit 102 comprises the respective functional blocks of a strategy policy creation unit 1100, a merge processing unit 1200, a condition determination processing unit 1300, a control strategy update unit 1400, and a rule update unit 1500. The arithmetic unit 102 can realize, in a software-like manner, the foregoing functional blocks by executing predetermined control programs with a CPU of a microcomputer or the like. Otherwise, these functional blocks may also be realized by using an electronic circuit comprising an arithmetic processing function such as an FPGA (Field Programmable Gate Array).

The communication unit 106 is connected to the PC 4 via the network 3, and performs data communication with the PC 4. The communication unit 106 receives the threat analysis table 2000 sent from the PC 4 and outputs the threat analysis table 2000 to the arithmetic unit 102, and sends, as the analytical result related to the strategy policy against the threat that is anticipated in the in-vehicle network to be designed, the strategy policy table (post-merge) 2500 read from the storage unit 101 to the PC 4.

With the PC 4, the strategy policy table (post-merge) 2500 received from the communication unit 106 is presented to the designer by displaying a screen on the display device (not shown). The designer is thereby able to easily confirm the security measures required against the threat that is anticipated in the in-vehicle network to be designed.

The strategy policy creation unit 1100 acquires the threat analysis table 2000 that the communication unit 106 received from the PC 4. The threat analysis table 2000 is information in which the analytical results against various security threats anticipated in the in-vehicle network to be designed are listed in a table format, and is created by the designer inputting predetermined information by using the PC 4. The strategy policy creation unit 1100 creates the strategy policy table (pre-merge) 2400 by using the threat analysis table 2000 acquired from the PC 4, and the control strategy table 2100 and the control strategy selection table 2200 among the retained information which is retained in the storage unit 101, and stores the created strategy policy table (pre-merge) 2400 in the storage unit 101.

The merge processing unit 1200 determines whether control strategies of the same type are included in the plurality of control strategies included in the strategy policy table (pre-merge) 2400 by referring to the merge rule table 2300 among the retained information which is retained in the storage unit 101. Consequently, when it is determined that the control strategies of the same type are included, the merge processing unit 1200 performs merge processing of grouping those control strategies as one control strategy item. Based on the foregoing merge processing, the respective control strategies of each threat which the strategy policy table (pre-merge) 2400 represents are grouped according to each type of control strategy, and the strategy policy table (post-merge) 2500 is thereby created. The merge processing unit 1200 stores the created strategy policy table (post-merge) 2500 as designer output information in the storage unit 101.

When the condition determination processing unit 1300 externally receives a notice on the new threat and control strategy, the condition determination processing unit 1300 determines whether to update the retained information in the storage unit 101. For example, the condition determination processing unit 1300 receives threat information related to the new threat that the administrator of the center server 2 inputted using an input device (not shown), and determines whether subject matter corresponding to the threat representing the threat information and its control strategy has previously been registered in the control strategy selection table 2200. Consequently, when the foregoing subject matter is unregistered, the condition determination processing unit 1300 determines that the retained information needs to be updated, instructs the control strategy update unit 1400 to update the control strategy table 2100, and instructs the rule update unit 1500 to update the control strategy selection table 2200 and the merge rule table 2300.

The control strategy update unit 1400 updates the control strategy table 2100 stored in the storage unit 101 according to the instruction of the condition determination processing unit 1300. The control strategy update unit 1400 updates the control strategy table 2100, for example, by adding an effective control strategy against the new threat to the control strategy table 2100 based on externally acquired threat information.

The rule update unit 1500 updates the control strategy selection table 2200 and the merge rule table 2300 stored in the storage unit 101 according to the instruction of the condition determination processing unit 1300. The rule update unit 1500 updates the control strategy selection table 2200, for example, by adding the selective conditions for selecting an effective control strategy against the new threat to the control strategy selection table 2200 based on externally acquired threat information. Moreover, the rule update unit 1500 updates the merge rule table 2300 by adding the merge conditions related to the characteristics of the corresponding control strategy to the merge rule table 2300.

Specific examples of the respective types of information of the threat analysis table 2000 sent from the PC 4 to the center server 2, and the control strategy table 2100, the control strategy selection table 2200, the merge rule table 2300, the strategy policy table (pre-merge) 2400, and the strategy policy table (post-merge) 2500 stored in the storage unit 101 are now explained with reference to FIG. 3 to FIG. 8.

Figure 3:
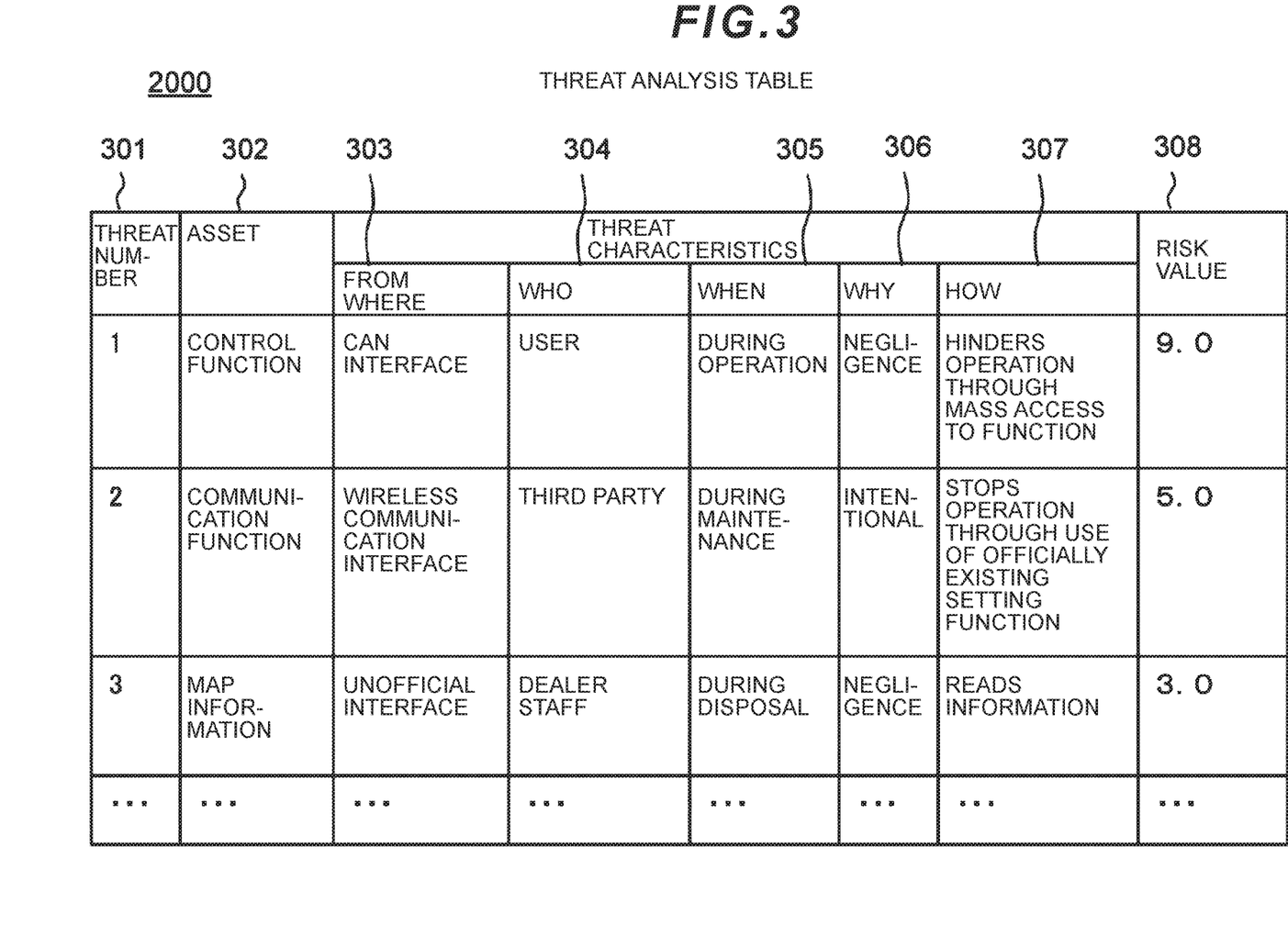
FIG. 3 is a diagram showing a configuration example of the threat analysis table.

FIG. 3 is a diagram showing a configuration example of the threat analysis table 2000. In the example shown in FIG. 3, the threat analysis table 2000 is configured from the respective items of a threat number 301, an asset 302, threat characteristics 303 to 307, and a risk value 308.

The threat number 301 is information for uniquely identifying the respective threats listed in the threat analysis table 2000, and a unique number is assigned to each threat. The asset 302 is information representing the asset that will be affected by the threat among the assets (functions and information) of the in-vehicle network to be designed. The threat characteristics 303 to 307 are information representing the characteristics of the threat. In the example of FIG. 3, the characteristics of the threat are represented by using the 5 W method which is broadly used as the countermeasure planning method against various problems. Specifically, the characteristics of the threat are represented based on the respective items of a threat characteristic 303 representing "from where" (pathway of entry), a threat characteristic 304 representing "who" (creator of the threat), a threat characteristic 305 representing "when" (timing that the threat occurred), a threat characteristic 306 representing "why" (cause of the threat), and a threat characteristic 307 representing "how" (method of the threat). The risk value 308 is information representing the level of risk caused by the threat. For example, the risk value 308 can be decided by performing a risk evaluation of the threat based on the level of influence on the assets, level of difficulty of conditions upon the occurrence of the threat, and the pathway upon the occurrence of the threat, and using the evaluation results thereof to decide the risk value 308. In this embodiment, for example, the risk value 308 can be calculated by using the Common Vulnerability Scoring System (CVSS) based on known information. In other words, by causing the designer to input data required for calculating the risk value using the CVSS in the PC 4 and managing this data by associating it with pre-stored data, it is possible to extract the threat anticipated in the in-vehicle network to be designed and automatically calculate the risk value of such threat.

Note that the threat analysis table 2000 may also be configured using a form of expression other than FIG. 3. For example, the characteristics of the threat may be expressed by using items other than the threat characteristics 303 to 307 such as the pathway in which damages may occur due to the threat or the stages in which damages may occur due to the threat. Otherwise, the threat analysis table 2000 may also be configured by using various forms of expression.

Figure 4:
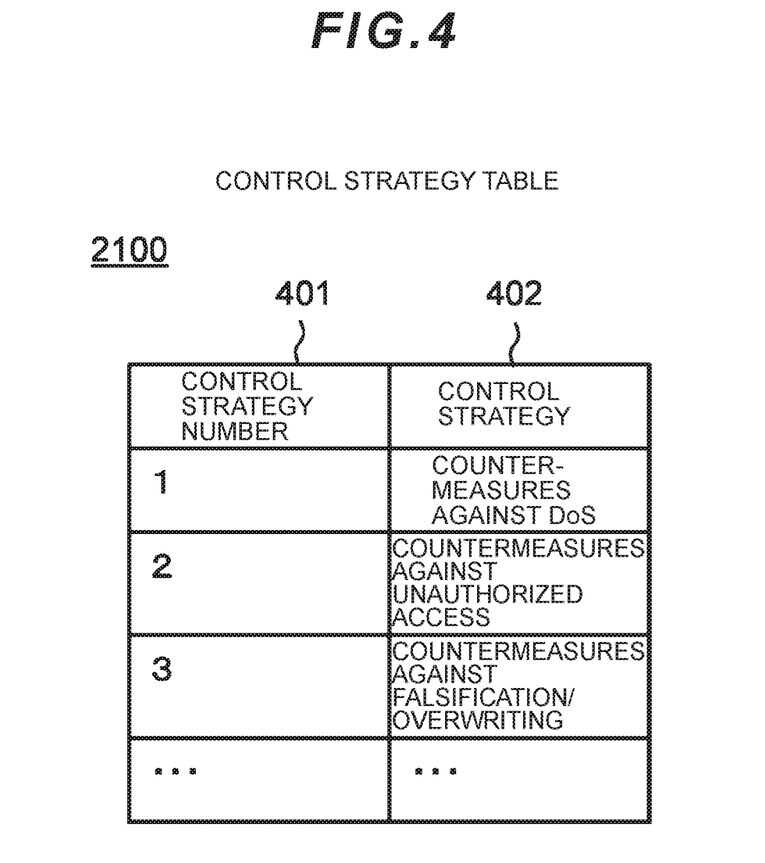
FIG. 4 is a diagram showing a configuration example of the control strategy table.

FIG. 4 is a diagram showing a configuration example of the control strategy table 2100. In the example shown in FIG. 4, the control strategy table 2100 is configured from the respective items of a control strategy number 401, and a control strategy 402.

The control strategy number 401 is information for uniquely identifying the respective control strategies listed in the control strategy table 2100, and a unique number is assigned to each control strategy. The control strategy 402 is information representing the various types of control strategies considered to be effective against various threats that may occur in the in-vehicle network to be designed. For example, the control strategy 402 shows the subject matter of the control strategies, which were prescribed in advance according to the type of threat, as being effective for preventing or reducing the occurrence of threats or reducing the damage that may be suffered upon the occurrence of threats.

Figure 5:
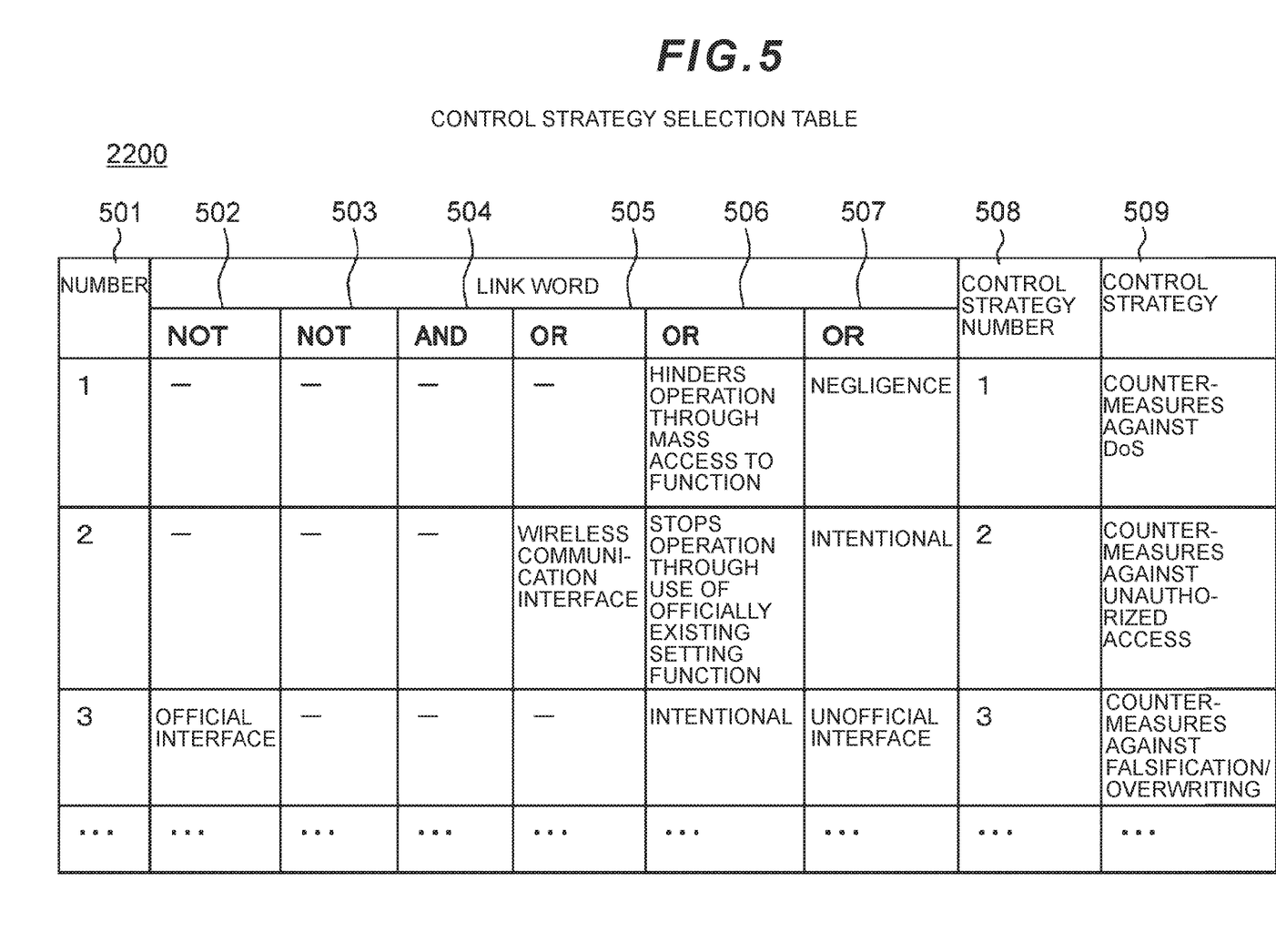
FIG. 5 is a diagram showing a configuration example of the control strategy selection table.

FIG. 5 is a diagram showing a configuration example of the control strategy selection table 2200. In the example shown in FIG. 5, the control strategy selection table 2200 is configured from the respective items of a number 501, link words 502 to 507, a control strategy number 508, and a control strategy 509.

The number 501 is information for uniquely identifying the respective selective conditions listed in the control strategy selection table 2200, and a unique number is assigned to each selective condition. The link words 502 to 507 are information representing the correspondence of the threat and the control strategy. In the example of FIG. 5, the correspondence of the threat and the control strategy is expressed using the 5 W method described above. Specifically, the link words (NOT) 502, 503 indicate exclusion conditions, and the terms indicated here represent that the threat included in the threat analysis table 2000 does not correspond to the control strategy. Meanwhile, the link word (AND) 504 and the link words (OR) 505 to 507 indicate matching conditions, and the terms indicated here represent that the threat included in the threat analysis table 2000 corresponds to the control strategy. Note that the link word (AND) 504 represents an AND condition; that is, the term required for satisfying the correspondence, and the link words (OR) 505 to 507 represent an OR condition; that is, the terms which satisfy the correspondence as a result of any of those terms being included. The control strategy number 508 and the control strategy 509 are information which represent the control strategy that is effective against the threat, and respectively correspond to the control strategy number 401 and the control strategy 402 in the control strategy table 2100 of FIG. 4.

The strategy policy creation unit 1100 selects the control strategy against the various threats anticipated in the in-vehicle network to be designed by comparing the threat analysis table 2000 shown in FIG. 3 and the control strategy selection table 2200 shown in FIG. 5. Specifically, the strategy policy creation unit 1100 extracts the selective condition corresponding to the threat among the plurality of selective conditions listed in the control strategy selection table 2200 by comparing the contents of the threat characteristics 303 to 307 and the contents of the link words 502 to 507 in the control strategy selection table 2200 regarding the respective threats shown in the threat analysis table 2000. Subsequently, the strategy policy creation unit 1100 selects the control strategy that is effective against the threat by referring to the control strategy 509 of the extracted selective condition. The strategy policy table (pre-merge) 2400 can be created by performing the foregoing processing regarding all threats included in the threat analysis table 2000 and summarizing the results in a tabular format.

For example, with the threat in which the value of the threat number 301 is "1" in the threat analysis table 2000 of FIG. 3, the characteristic of "negligence" is indicated in the threat characteristic 306 and the characteristic of "hinders operation through mass access to function" is indicated in the threat characteristic 307, respectively. Accordingly, in the control strategy selection table 2200 of FIG. 5, the selective condition in which the matching conditions shown in the link words 507, 506 respectively match these characteristics; that is, the selective condition in which the value of the number 501 is "1" is extracted, and "countermeasures against DoS" indicated in the control strategy 509 of that selective condition is selected as the control strategy corresponding to the threat.

Moreover, with the threat in which the value of the threat number 301 is "2" in the threat analysis table 2000 of FIG. 3, the characteristic of "wireless communication interface" is indicated in the threat characteristic 303, the characteristic of "intentional" is indicated in the threat characteristic 306, and the characteristic of "stops operation through use of officially existing setting function" is indicated in the threat characteristic 307, respectively. Accordingly, in the control strategy selection table 2200 of FIG. 5, the selective condition in which the matching conditions shown in the link words 505, 507, 506 match these characteristics; that is, the selective condition in which the value of the number 501 is "2" is extracted, and "countermeasures against unauthorized access" indicated in the control strategy 509 of that selective condition is selected as the control strategy corresponding to the threat.

Moreover, with the threat in which the value of the threat number 301 is "3" in the threat analysis table 2000 of FIG. 3, the characteristic of "unofficial interface" is indicated in the threat characteristic 303. Accordingly, in the control strategy selection table 2200 of FIG. 5, as the selective condition in which the matching condition shown in the link word 507 matches this characteristic and in which the exclusion condition shown in the link word 502 does not match this characteristic, the selective condition in which the value of the number 501 is "3" is selected, and "countermeasures against falsification/overwriting" indicated in the control strategy 509 of that selective condition is selected as the control strategy corresponding to the threat.

Note that, with the control strategy selection table 2200, the correspondence of the threat and the control strategy may also be expressed using expressions other than the exclusion conditions or the matching conditions shown in the link words 502 to 507 of FIG. 5. In the strategy policy creation unit 1100, so as long as a plurality of control strategies corresponding respectively to a plurality of threats that are anticipated in the in-vehicle network to be designed can be appropriately selected, any form of expression may be used to express the correspondence of the threat and the control strategy.

Figure 6:
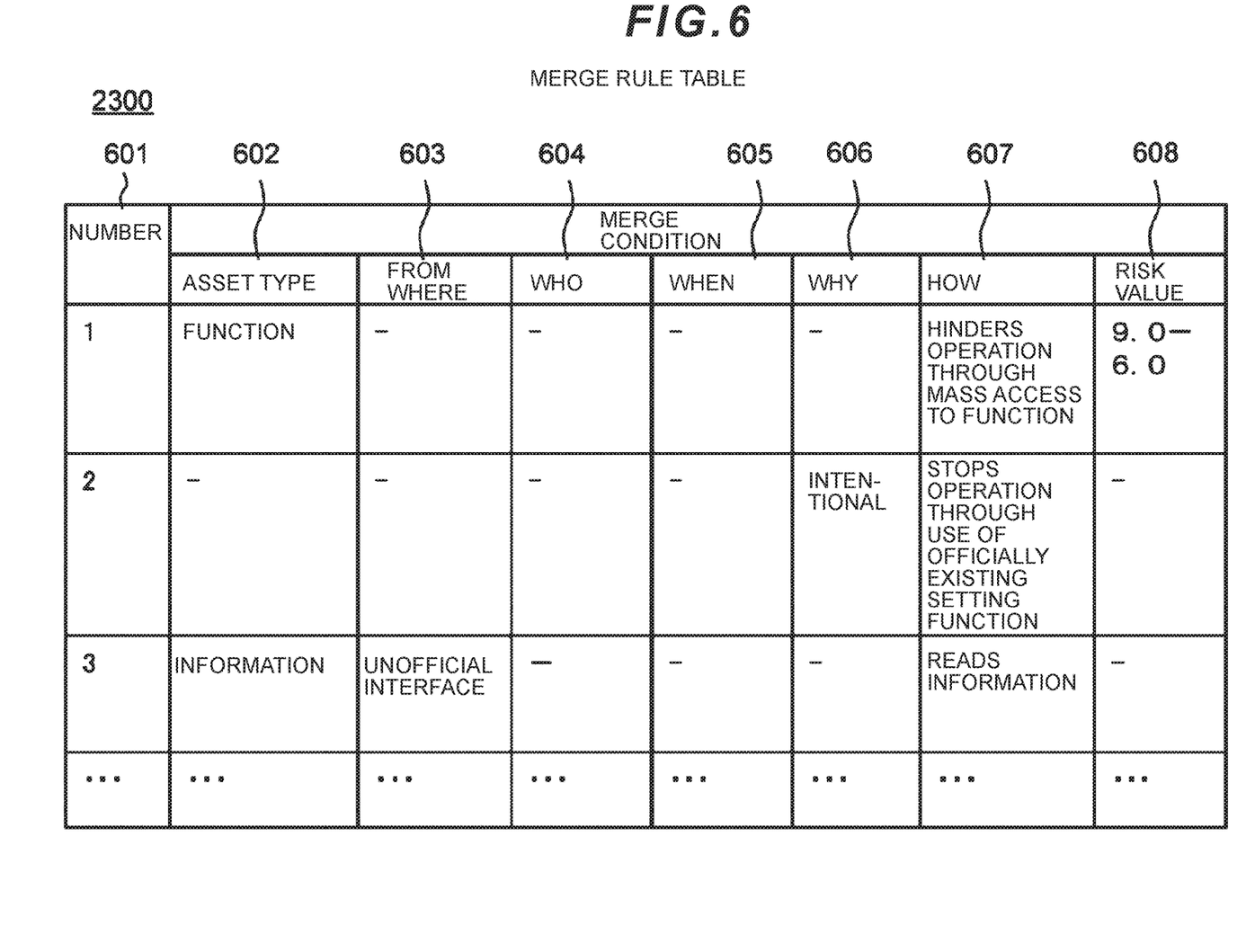
FIG. 6 is a diagram showing a configuration example of the merge rule table.

FIG. 6 is a diagram showing a configuration example of the merge rule table 2300. In the example shown in FIG. 6, the merge rule table 2300 is configured from the respective items of a number 601, and merge conditions 602 to 608.

The number 601 is information for uniquely identifying the respective merge conditions listed in the merge rule table 2300, and a unique number is assigned to each merge condition. The merge conditions 602 to 608 are information representing the conditions for merging the plurality of control strategies. In the example of FIG. 6, the conditions for merging the plurality of control strategies are shown based on the type of asset related to the control strategy, the characteristics of the threat corresponding to the control strategy expressed using the 5 W method described above, and the risk value of the threat. Specifically, the merge conditions of the control strategies are shown based on the respective items of the merge condition 602 which represents the type of asset, the merge conditions 603 to 607 corresponding respectively to the threat characteristics 303 to 307 of FIG. 3, and the merge condition 608 corresponding to the risk value 308 of FIG. 3.

Note that, in the merge rule table 2300, the conditions for merging the plurality of control strategies may also be expressed by using expressions other than those shown in the merge conditions 602 to 608 of FIG. 6. In the merge processing unit 1200, so as long as the control strategies of the same type can be properly merged among the plurality of control strategies corresponding respectively to the plurality of threats that are anticipated in the in-vehicle network to be designed, any form of expression may be used to express the conditions for merging the plurality of control strategies.

Figure 7:
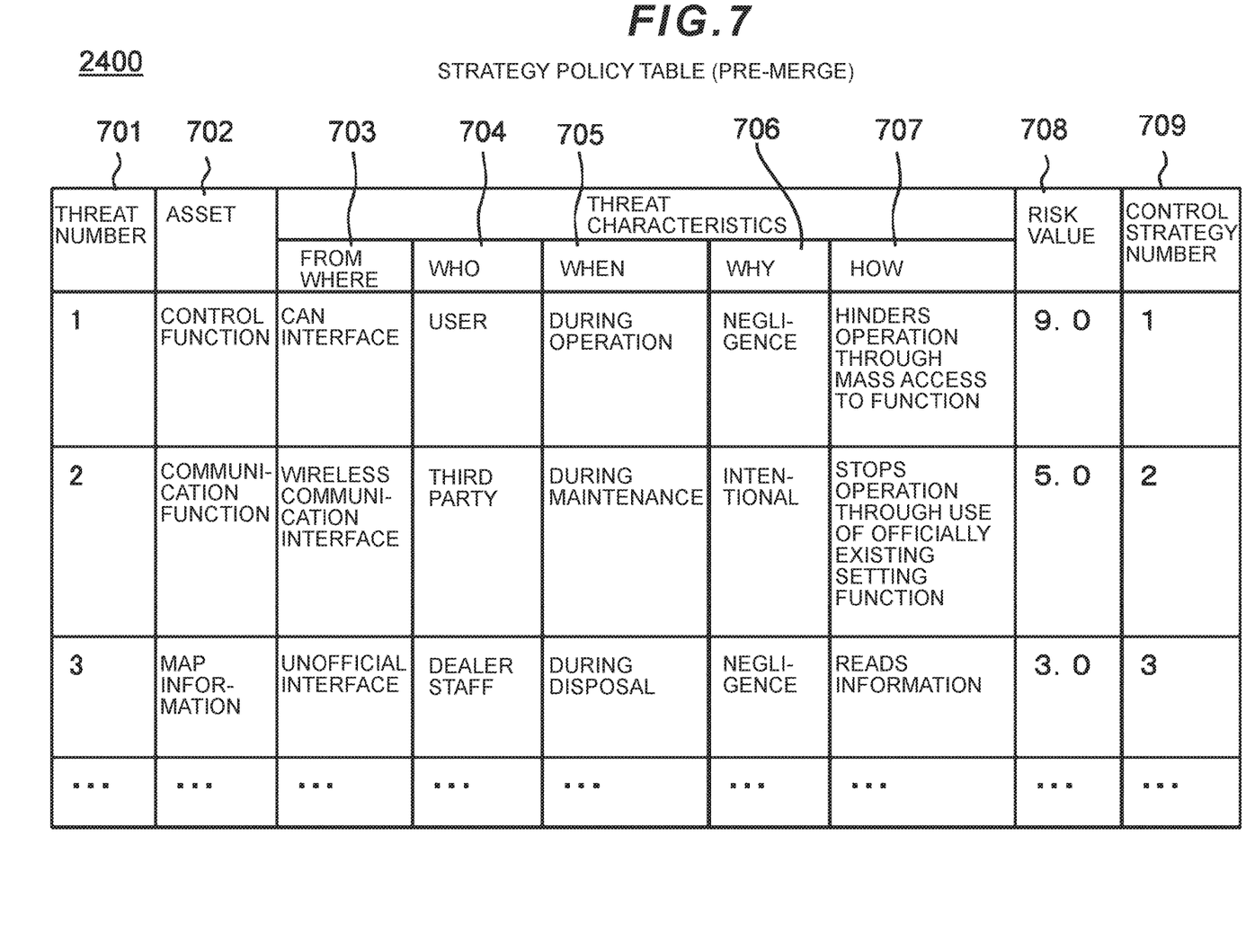
FIG. 7 is a diagram showing a configuration example of the strategy policy table (pre-merge).

FIG. 7 is a diagram showing a configuration example of the strategy policy table (pre-merge) 2400. In the example shown in FIG. 7, the strategy policy table (pre-merge) 2400 is configured from the respective items of a threat number 701, an asset 702, threat characteristics 703 to 707, a risk value 708, and a control strategy number 709.

The threat number 701 is information for uniquely identifying the threat in each strategy policy listed in the strategy policy table (pre-merge) 2400. The asset 702 is information representing the asset that will be affected by the threat among the assets of the in-vehicle network to be designed. The threat characteristics 703 to 707 are information representing the characteristics of the threat. The risk value 708 is information representing the level of risk caused by the threat. The control strategy number 709 is information for identifying the control strategy corresponding to the threat. Note that the threat number 701, the asset 702, the threat characteristics 703 to 707, and the risk value 708 correspond respectively to the threat number 301, the asset 302, the threat characteristics 303 to 307, and the risk value 308 in the threat analysis table 2000 of FIG. 3. Moreover, the control strategy number 709 corresponds to the control strategy number 401 in the control strategy table 2100 of FIG. 4 and the control strategy number 508 in the control strategy selection table 2200 of FIG. 5.

The strategy policy creation unit 1100 can create the strategy policy table (pre-merge) 2400 of FIG. 7 by performing the foregoing processing using the threat analysis table 2000 shown in FIG. 3 and the control strategy selection table 2200 shown in FIG. 5. Specifically, the contents of the threat number 701, the asset 702, the threat characteristics 703 to 707, and the risk value 708 of FIG. 7 are respectively determined based on the contents described in the respective items of the threat number 301, the asset 302, the threat characteristics 303 to 307, and the risk value 308 of FIG. 3. Moreover, with regard to the respective threats identified based on these items, the value of the control strategy number 709 of FIG. 7 is determined from the value of the control strategy number 508 corresponding to the control strategy selected based on the comparison with the control strategy selection table 2200 of FIG. 5.

Figure 8:
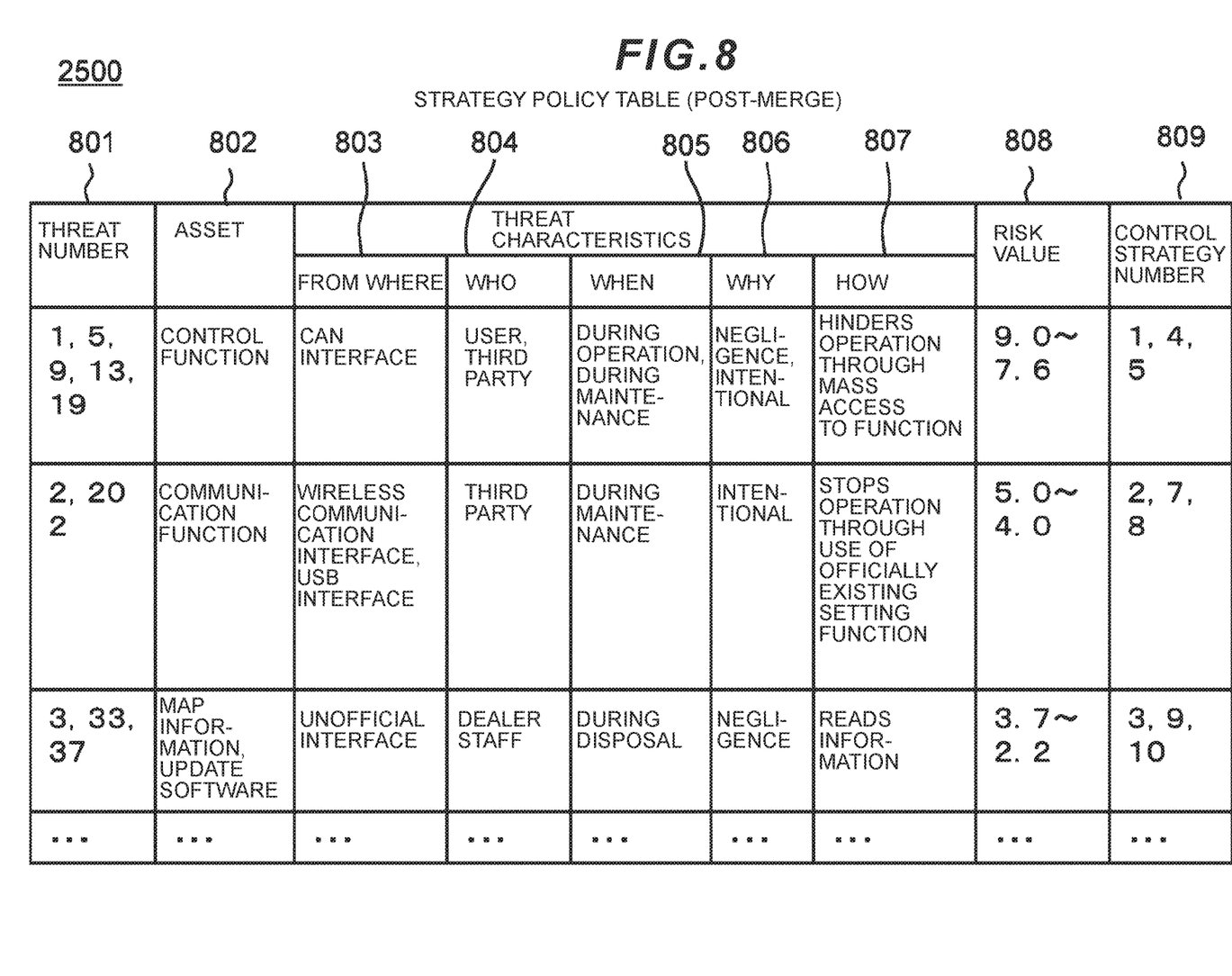
FIG. 8 is a diagram showing a configuration example of the strategy policy table (post-merge).

FIG. 8 is a diagram showing a configuration example of the strategy policy table (post-merge) 2500. In the example shown in FIG. 8, the strategy policy table (post-merge) 2500 is configured from the respective items of a threat number 801, an asset 802, threat characteristics 803 to 807, a risk value 808, and a control strategy number 809.

The threat number 801 is information for uniquely identifying the threat in each strategy policy listed in the strategy policy table (post-merge) 2500 in the same manner as the threat number 701 in the strategy policy table (pre-merge) 2400 of FIG. 7. However, in the strategy policy table (post-merge) 2500, there are cases where a plurality of numbers are indicated in the threat number 801 in order to represent the plurality of threats corresponding to the plurality of control strategies of the same type which were merged into one group. The asset 802, the threat characteristics 803 to 807, and the risk value 808 are respectively the same as the asset 702, the threat characteristics 703 to 707, and the risk value 708 in the strategy policy table (pre-merge) 2400 of FIG. 7. However, in the strategy policy table (post-merge) 2500, there are cases where a range from the minimum value to the maximum value is indicated in the risk value 808 in order to represent the risk value of the plurality of threats corresponding to the plurality of control strategies of the same type which were merged into one group. The control strategy number 809 is information for identifying the control strategy corresponding to the threat in the same manner as the control strategy number 709 in the strategy policy table (pre-merge) 2400 of FIG. 7. However, in the strategy policy table (post-merge) 2500, there are cases where a plurality of numbers are indicated in the control strategy number 809 in order to represent the plurality of control strategies of the same type which were merged into one group.

The merge processing unit 1200 can create the strategy policy table (post-merge) 2500 of FIG. 8 by using the merge rule table 2300 shown in FIG. 6 and merging the control strategies of the same type among the plurality of control strategies representing the strategy policy table (pre-merge) 2400 shown in FIG. 7 and grouping the plurality of control strategies.

For example, in the merge rule table 2300 of FIG. 6, the merge conditions in which the value of the number 601 is "1" are that the type of asset corresponds to "function", has a characteristic of "hinders operation through mass access to function", and the threat in which the risk value is within the range of "9.0" to "6.0" and the control strategy corresponding thereto are merged into one group. Moreover, in the merge rule table 2300 of FIG. 6, the merge condition in which the value of the number 601 is "2" is that the threat having the characteristics of "intentional" and "stops operation through use of officially existing setting function" and the control strategy corresponding thereto are merged into one group. Moreover, in the merge rule table 2300 of FIG. 6, the merge conditions in which the value of the number 601 is "3" are that the type of asset corresponds to "information", and the threat having the characteristics of "unofficial interface" and "reads information" and the control strategy corresponding thereto are merged into one group. The strategy policy table (post-merge) 2500 of FIG. 8 is created by applying these merge conditions to the strategy policy table (pre-merge) 2400 of FIG. 7.

Figure 9:
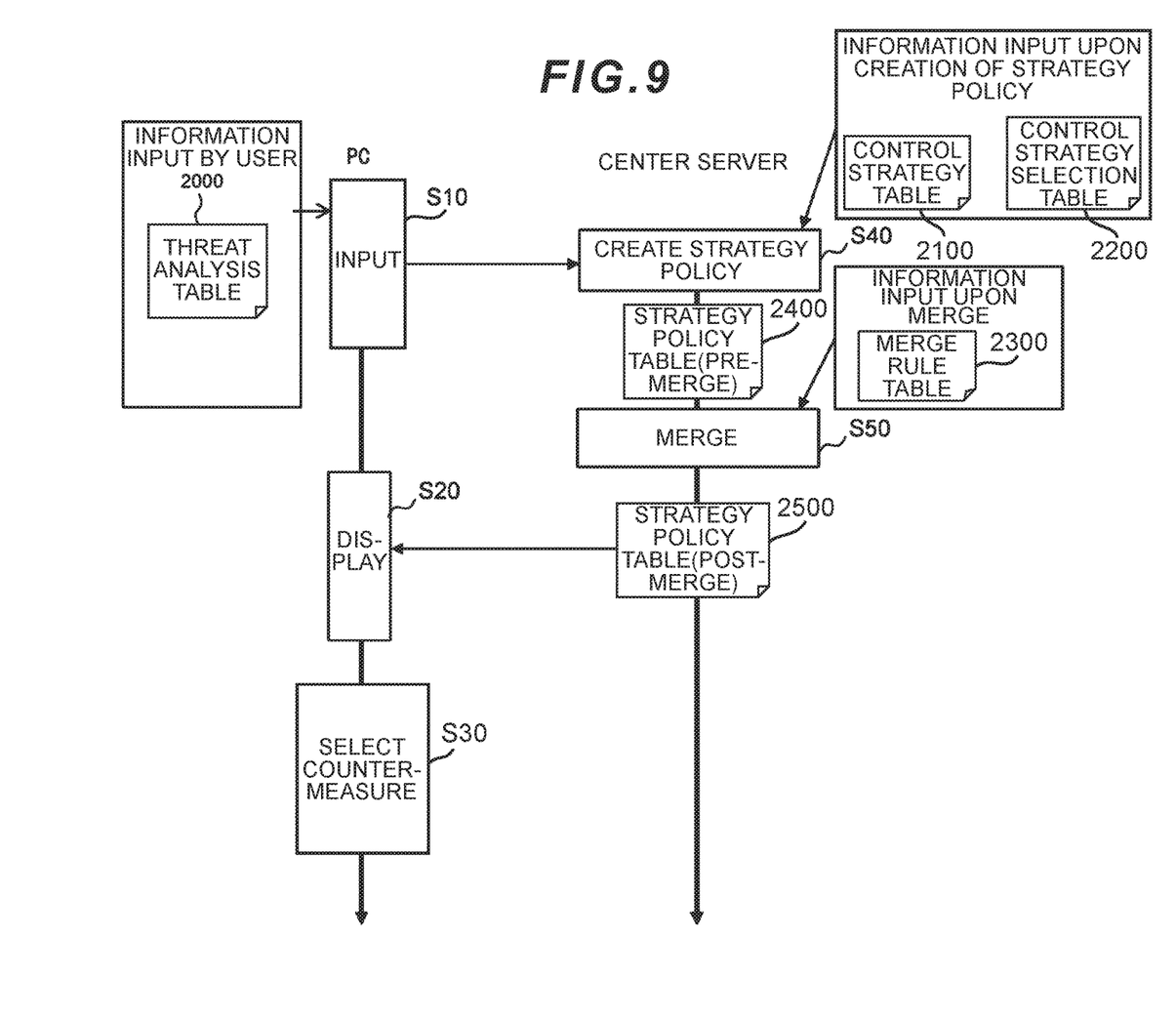
FIG. 9 is a sequence diagram of the security design planning support system.

FIG. 9 is a sequence diagram showing the processing flow executed by the security design planning support system 1.

In step S10, the PC 4 creates the threat analysis table 2000 from the information input by the designer, and sends the created threat analysis table 2000 to the center server 2.

In step S40, the center server 2 uses the strategy policy creation unit 1100 to create a strategy policy corresponding to the security threat that is anticipated in the in-vehicle network to be designed based on the threat analysis table

2000 sent from the PC 4 in step S10. Here, by inputting the control strategy table 2100 and the control strategy selection table 2200 stored in the storage unit 101 as information for use in creating the strategy policy and using the foregoing information, the control strategy corresponding to each threat listed in the threat analysis table 2000 is selected and the strategy policy table (pre-merge) 2400 is thereby created.

In step S50, the center server 2 uses the merge processing unit 1200 to perform merge processing to the strategy policy table (pre-merge) 2400 created in step 40 to merge the control strategies of the same type and group the control strategies. Here, by inputting the merge rule table 2300 stored in the storage unit 101 as information for use in merge processing and using such information, the control strategies of the same type among the plurality of control strategies listed in the strategy policy table (pre-merge) 2400 are grouped, and the strategy policy table (post-merge) 2500 is thereby created. After creating the strategy policy table (post-merge) 2500, the center server 2 uses the communication unit 106 to send the created strategy policy table (post-merge) 2500 to the PC 4.

In step S20, the PC 4 receives the strategy policy table (post-merge) 2500 sent from the center server 2 in step S50, creates a display screen as shown in FIG. 8 based on the strategy policy table (post-merge) 2500, and displays the created display screen on the display device (not shown).

In step S30, the designer refers to the strategy policy shown in the screen of FIG. 8 displayed on the display device of the PC 4 in step S30, and selects the countermeasure against the threat in the in-vehicle network to be designed.

Figure 10:
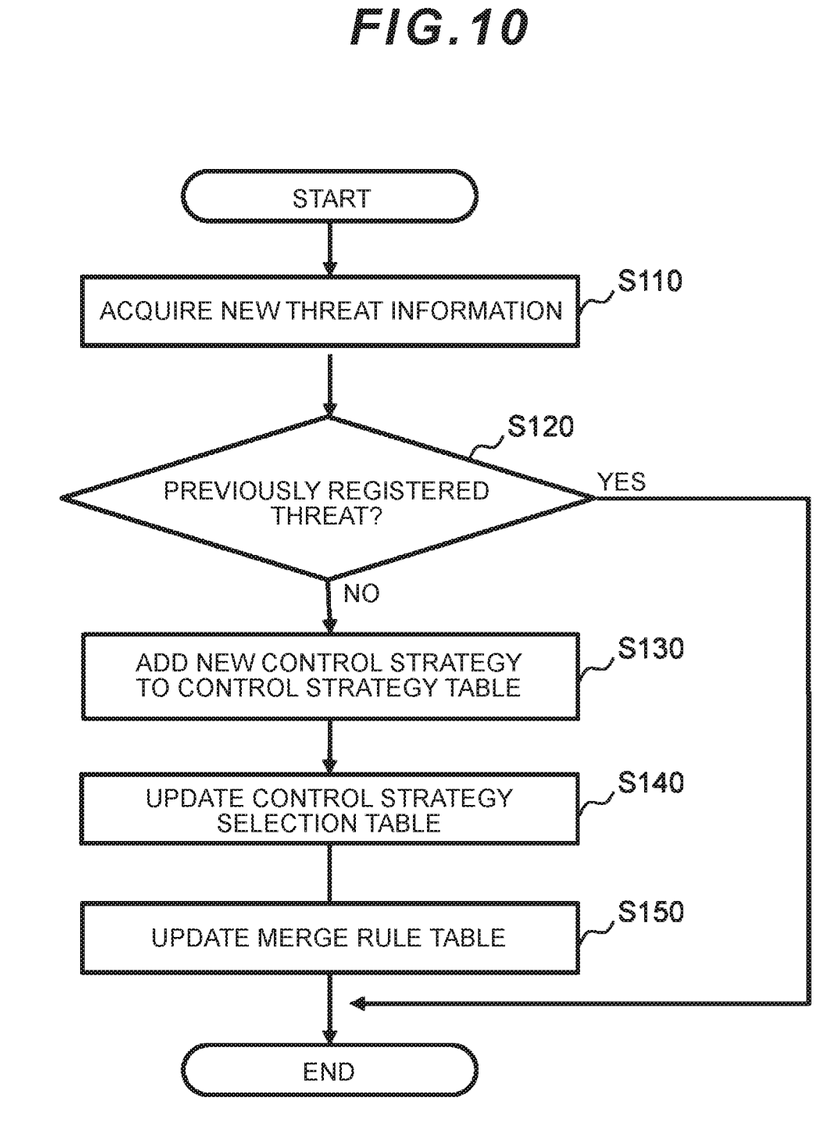
FIG. 10 is a flowchart of the retained information update processing executed by the center server.

FIG. 10 is a flowchart showing the flow of the retained information update processing executed by the center server 2 in the security design planning support system 1.

In step S110, the center server 2 uses the communication unit 106 to externally acquire threat information related to the new threat.

In step S120, the center server 2 uses the condition determination processing unit 1300 to determine whether the threat included in the threat information acquired in step S110 is a previously registered threat. Here, the combination of a threat that coincides with the acquired threat information and the control strategy is searched in the control strategy selection table 2200 and, if no such coinciding combination exists in the control strategy selection table 2200, it is determined that the threat is not a previously registered threat; that is, the threat is an unregistered threat, and the process proceeds to step 130. Meanwhile, if a coinciding combination exists in the control strategy selection table 2200, it is determined that the threat is a previously registered threat, and the processing flow of FIG. 10 is ended.

In step S130, the center server 2 uses the control strategy update unit 1400 to add as a new control strategy, to the control strategy table 2100, the control strategy that is effective against the threat determined to be unregistered in step S120.

In step S140, the center server 2 uses the rule update unit 1500 to add a new selective condition to the control strategy selection table 2200 based on the combination of the threat determined to be unregistered in step S120 and the control strategy, and thereby update the control strategy selection table 2200.

In step S150, the center server 2 uses the rule update unit 1500 to add a new merge condition to the merge rule table 2300 based on the combination of the threat determined to be unregistered in step S120 and the control strategy, and thereby update the merge rule table 2300. After executing the processing of step S150, the center server 2 ends the processing of FIG. 10.

According to an embodiment of the present invention explained above, because the threats having the same type of control strategy can be handled as an aggregate, the strategy policy can be presented to the designer while maintaining the mutual association of the plurality of threats and the control strategies. Consequently, it is possible to reduce the man-hours required for planning security measures and ensure the traceability thereof According to an embodiment of the present invention explained above, the following operations and effects are yielded.

(1) A center server 2 is a device which supports planning of a security design of an in-vehicle network, comprising a strategy policy creation unit 1100 which creates first strategy policy information, that is, a strategy policy table (pre-merge) 2400, representing a plurality of control strategies corresponding respectively to threats against the in-vehicle network, a merge processing unit 1200 which merges control strategies of a same type among the plurality of control strategies represented by the strategy policy table (pre-merge) 2400 created by the strategy policy creation unit 1100 and groups the plurality of control strategies, and a communication unit 106 which externally outputs second strategy policy information, that is, a strategy policy table (post-merge) 2500, representing a relationship of the threats and the plurality of control strategies grouped by the merge processing unit 1200. As a result of adopting the foregoing configuration, the designer can easily confirm the security measures required against the threats that are anticipated in an in-vehicle network.

(2) The center server 2 further comprises a storage unit 101 which stores merge rule information, that is, a merge rule table 2300, related to pre-set characteristics of each of the control strategies. The merge processing unit 1200 merges the control strategies of the same type using the merge rule table 2300. As a result of adopting the foregoing configuration, the control strategies of the same type among the plurality of control strategies listed in the strategy policy table (pre-merge) 2400 can be reliably merged.

(3) The center server 2 further comprises a storage unit 101 which stores control strategy selection information, that is, a control strategy selection table 2200, representing a pre-set relationship of each of the threats and each of the control strategies. The strategy policy creation unit 1100 acquires threat analysis information, that is, a threat analysis table 2000, representing an analytical result against the threat, and creates a strategy policy table (pre-merge) 2400 using the threat analysis table 2000 and the control strategy selection table 2200. As a result of adopting the foregoing configuration, it is possible to reliably select a control strategy that is effective against the threat and thereby create the strategy policy table (pre-merge) 2400.

(4) The center server 2 further comprises a rule update unit 1500 which updates the control strategy selection table 2200 and the merge rule table 2300 based on externally acquired information. As a result of adopting the foregoing configuration, it is possible to constantly maintain the control strategy selection table 2200 and the merge rule table 2300 up to date.

(5) The communication unit 106 outputs the strategy policy table (post-merge) 2500 to a PC 4, which is an external computer. The strategy policy table (post-merge) 2500 is information for displaying, on a display device of the PC 4, a screen as shown in FIG. 8 indicating a relationship of the threats and the plurality of control strategies grouped by the merge processing unit 1200. As a result of adopting the foregoing configuration, it is possible to present the security measures required against the threats that are anticipated in an in-vehicle network to the designer in an easy-to-understand display format.

Note that the embodiments and various modified examples explained above are merely illustrative. So as long as the features of the present invention are not impaired, the present invention is not limited to the foregoing embodiments, and other modes that are considered to fall within the scope of the technical concept of the present invention also fall within the scope of the present invention. In other words, another configuration may be arbitrarily added to, deleted from or replaced with a part of the configuration of each embodiment.

Moreover, a part or all of the respective configurations and functions described above may be realized with hardware such as an integrated circuit. Moreover, each of the foregoing configurations and functions may also be realized with software by a processor interpreting programs for realizing the respective functions and executing such programs. Information of programs, tables and files for realizing the respective functions may be recorded in a memory, a hard disk, an SSD (Solid State Drive) or any other recording device, or may otherwise be recorded on an IC (Integrated Circuit) card, a memory card, a DVD or any other recording medium.

The disclosure of the following priority application is herein incorporated by reference: Japanese Patent Application No. 2019-030972 filed Feb. 22, 2019.

REFERENCE SIGNS LIST

1 . . . security design planning support system, 2 . . . center server, 3 . . . network, 4 . . . PC, 20 . . . processing unit, 101 . . . storage unit, 102 . . . arithmetic unit, 106 . . . communication unit, 1100 . . . strategy policy creation unit, 1200 . . . merge processing unit, 1300 . . . condition determination processing unit, 1400 . . . control strategy update unit, 1500 . . . rule update unit, 2000 . . . threat analysis table, 2100 . . . control strategy table, 2200 . . . control strategy selection table, 2300 . . . merge rule table, 2400 . . . strategy policy table (pre-merge), 2500 . . . strategy policy table (post-merge)

The invention claimed is:

1. A security design support device which supports a security design of an in-vehicle network, comprising:
   a strategy policy creation circuit which creates first strategy policy information representing a plurality of control strategies corresponding respectively to threats against the in-vehicle network;
   a merge processing circuit which merges control strategies of a same type among the plurality of control strategies represented by the first strategy policy information created by the strategy policy creation circuit and groups the plurality of merged control strategies; and
   a communication device which outputs second strategy policy information representing a combination of the threats and the plurality of merged control strategies grouped by the merge processing circuit, and control strategy numbers representing the plurality of control strategies of the same type which were merged into one group.

2. The security design support device according to claim 1, further comprising:
   a storage device which stores merge rule information related to pre-set characteristics of each of the control strategies,
   wherein the merge processing circuit merges the control strategies of the same type using the merge rule information.

3. The security design support device according to claim 2, further comprising: a rule update circuit which updates the merge rule information based on externally acquired information.

4. The security design support device according to claim 1, further comprising:
   a storage device which stores control strategy selection information representing a pre-set relationship of each of the threats and each of the control strategies,
   wherein the strategy policy creation circuit acquires threat analysis information representing an analytical result against the threat, and creates the first strategy policy information using the threat analysis information and the control strategy selection information.

5. The security design planning support device according to claim 4, further comprising:
   a rule update circuit which updates the control strategy selection information based on externally acquired information.

6. The security design support device according to claim 1,
   wherein the communication device outputs the second strategy policy information to an external computer, and
   wherein the second strategy policy information is information for displaying, on a display device of the computer, a screen indicating a relationship of the threats and the plurality of merged control strategies grouped by the merge processing circuit.

7. A security design support device which supports a security design of an in-vehicle network, comprising:
   a strategy policy creation circuit which creates first strategy policy information representing a plurality of control strategies corresponding respectively to threats against the in-vehicle network;
   a merge processing circuit which merges control strategies of a same type among the plurality of control strategies represented by the first strategy policy information created by the strategy policy creation circuit and groups the merged plurality of control strategies; and
   a communication device which outputs second strategy policy information representing a relationship of the threats and the plurality of merged control strategies grouped by the merge processing circuit, wherein
   the communication outputs the second strategy policy information to an external computer, and wherein
   the second strategy policy information is information for displaying, on a display device of the computer, a screen indicating a relationship of the threats and the plurality of merged control strategies grouped by the merge processing circuit.

8. The security design support device according to claim 7, further comprising: a storage device which stores merge rule information related to pre-set characteristics of each of the control strategies,
   wherein the merge processing circuit merges the control strategies of the same type using the merge rule information.

9. The security design support device according to claim 8, further comprising:
a rule update circuit which updates the merge rule information based on externally acquired information.

10. The security design support device according to claim 7, further comprising: a storage device which stores control strategy selection information representing a pre-set relationship of each of the threats and each of the control strategies,
wherein the strategy policy creation circuit acquires threat analysis information representing an analytical result against the threat, and creates the first strategy policy information using the threat analysis information and the control strategy selection information.

11. The security design support device according to claim 10, further comprising: a rule update circuit which updates the control strategy selection information based on externally acquired information.

* * * * *